United States Patent
Bit-Babik et al.

(10) Patent No.: US 11,374,611 B2
(45) Date of Patent: Jun. 28, 2022

(54) UNIVERSAL SMA AND FERRULE ANTENNA INTERFACE FOR COMMUNICATION DEVICES

(71) Applicant: MOTOROLA SOLUTIONS, INC., Chicago, IL (US)

(72) Inventors: Giorgi Bit-Babik, Plantation, FL (US); Antonio Faraone, Fort Lauderdale, FL (US); Jorge L. Garcia, Plantation, FL (US); Bruce D. Oberlies, Cary, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 124 days.

(21) Appl. No.: 17/012,936

(22) Filed: Sep. 4, 2020

(65) Prior Publication Data
US 2022/0077887 A1    Mar. 10, 2022

(51) Int. Cl.
*H04B 1/401*    (2015.01)
*H04B 17/10*    (2015.01)
*H01Q 1/52*    (2006.01)

(52) U.S. Cl.
CPC ............... *H04B 1/401* (2013.01); *H01Q 1/52* (2013.01); *H04B 17/102* (2015.01)

(58) Field of Classification Search
CPC .......... H04B 1/40; H04B 1/401; H04B 17/12; H04B 17/102; H04B 17/104; H01Q 1/28; H01Q 1/52
See application file for complete search history.

(56) References Cited

U.S. PATENT DOCUMENTS

| | | |
|---|---|---|
| 2,421,516 A | 6/1947 | Mitchell |
| 5,577,269 A | 11/1996 | Ludewig |
| 6,222,503 B1 * | 4/2001 | Gietema .................. H01Q 1/44 343/890 |
| 7,930,010 B2 | 4/2011 | Johansson et al. |
| 8,366,483 B2 | 2/2013 | Hardy et al. |
| 8,730,052 B1 | 5/2014 | DePoy |

(Continued)

OTHER PUBLICATIONS

Hirose Electric Co., Ltd., "Interface RF Connector with Switch, built-in interlock, DC to 3 GHz," 2020, pp. 125-130.

*Primary Examiner* — Thanh C Le
(74) *Attorney, Agent, or Firm* — Michael Best & Friedrich LLP

(57) ABSTRACT

Communication device with configurable antenna interface and method for configuring an antenna interface. One implementation of the communication device includes an RF transceiver, a threaded coaxial antenna connector, a first RF terminal, a second RF terminal, an RF signal conduit, and an interface circuit. The threaded coaxial antenna connector includes inner and outer terminals. The RF signal conduit includes a first structure that couples the first RF terminal to the inner terminal of the threaded coaxial antenna connector. The RF signal conduit further includes a second structure that couples the second RF terminal to the outer terminal of the threaded coaxial antenna connector. The interface circuit is configured to set an SMA antenna interface mode by coupling the RF transceiver to the first RF terminal. The interface circuit is also configured to set a ferrule antenna interface mode by coupling the RF transceiver to the second RF terminal.

20 Claims, 9 Drawing Sheets

(56) References Cited

U.S. PATENT DOCUMENTS

| | | | |
|---|---|---|---|
| 10,873,349 B1* | 12/2020 | Bit-Babik | H04B 1/18 |
| 2006/0134988 A1* | 6/2006 | Droesbeke | H01R 9/0527 |
| | | | 439/607.41 |
| 2012/0293391 A1* | 11/2012 | Simmons | H01Q 1/007 |
| | | | 343/859 |
| 2018/0261918 A1* | 9/2018 | Lelchuk | H04W 24/02 |
| 2019/0258010 A1* | 8/2019 | Anderson | G02B 6/382 |
| 2020/0119457 A1* | 4/2020 | Fried | H01Q 1/42 |
| 2020/0194867 A1 | 6/2020 | Lee et al. | |
| 2021/0083757 A1* | 3/2021 | Gustafson | H04B 7/15507 |
| 2021/0119340 A1* | 4/2021 | Sang | H01Q 1/28 |
| 2022/0011076 A1* | 1/2022 | Hamer | F41H 13/0075 |

* cited by examiner

UNIVERSAL SMA AND FERRULE ANTENNA INTERFACE FOR COMMUNICATION DEVICES

BACKGROUND OF THE INVENTION

Many portable LMR (land mobile radio) radio devices are provided with external antennas featuring either an SMA-type (Sub-Miniature version A) or a ferrule-type interface. Each type of interface provides unique features. SMA-type interfaces provide, for example, a 50-ohm RF (radio-frequency) output needed to perform conducted RF power measurements. However, antennas with SMA-type interfaces are generally larger in size when they include integrated tuning and matching circuits, for instance to support multiband LMR communication. With ferrule-type interfaces, which do not provide a return RF current path, the tuning and matching circuits are necessarily embedded in the radio. Thus, antennas with ferrule-type interfaces are able to be generally smaller in size. However, ferrule-type interfaces do not provide a 50-ohm RF output needed to perform conducted RF power test measurements.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate implementations of concepts that include the claimed invention, and explain various principles and advantages of those implementations.

Figure 1:
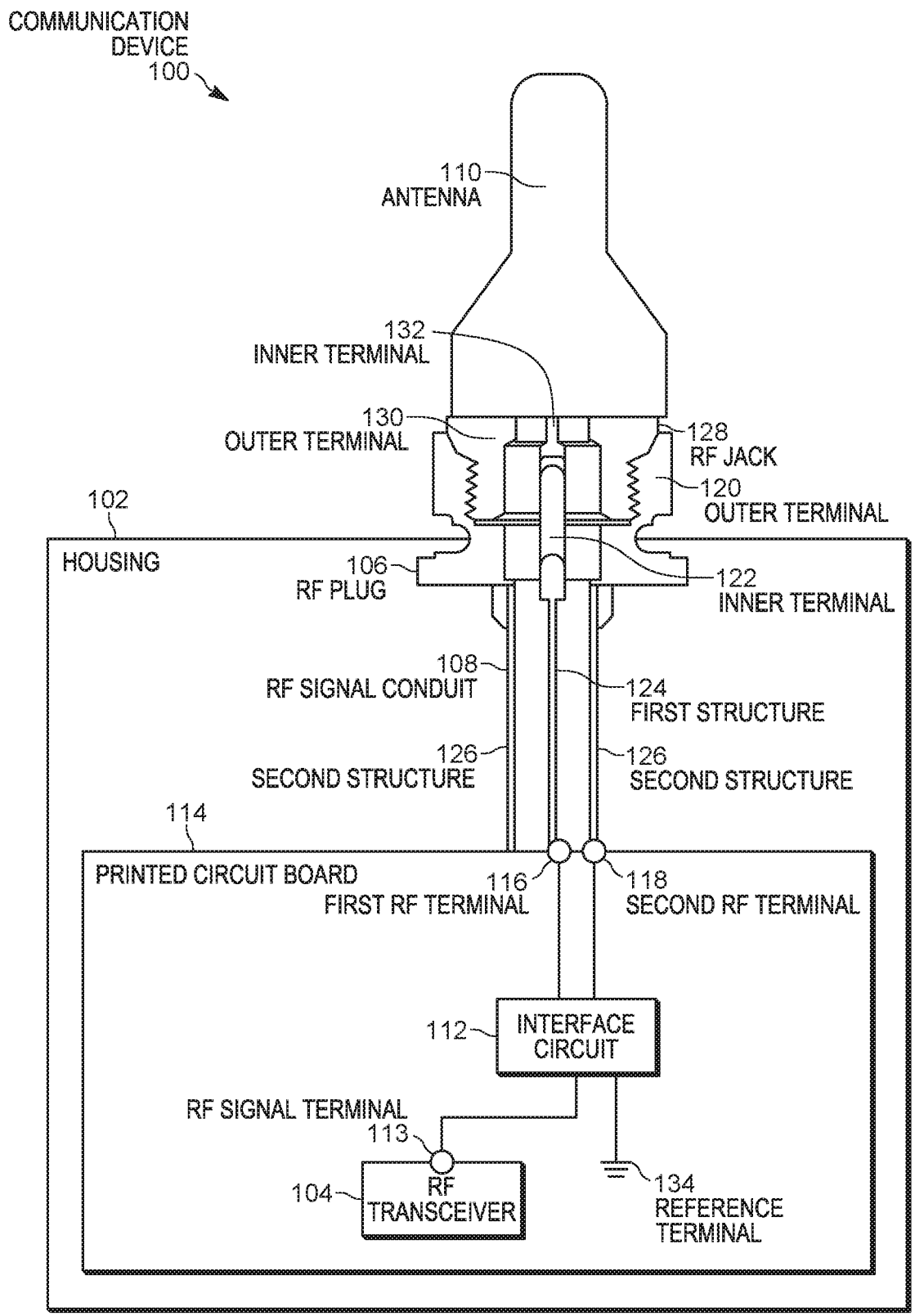
FIG. 1 is a block diagram of an example of a communication device with an RF signal conduit formed by a coaxial cable, an antenna having an SMA-type interface, and an interface circuit, in accordance with some implementations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present disclosure.

The system and method components have been represented where appropriate by conventional symbols in the drawings, showing only those specific details that are pertinent to understanding the implementations of the present disclosure so as not to obscure the disclosure with details that will be readily apparent to those of ordinary skill in the art having the benefit of the description herein.

DETAILED DESCRIPTION OF THE INVENTION

As noted above, many portable LMR (land mobile radio) radios have external antennas featuring either an SMA-type (Sub-Miniature version A) or a ferrule-type interface. There is a need for a wireless communication device with an antenna interface that supports both SMA-type and ferrule-type antennas. Among other things, the implementations presented herein provide an antenna interface for a communication device that operates with both SMA-type and ferrule-type antennas. In addition, the implementations presented herein provide a method for determining whether an antenna coupled to a communication device is SMA-type or ferrule-type.

The present disclosure provides a communication device that, in one implementation, includes an RF transceiver, a threaded coaxial antenna connector, a first RF terminal, a second RF terminal, an RF signal conduit, and an interface circuit. The RF transceiver includes an RF signal terminal. The threaded coaxial antenna connector includes an inner terminal and an outer terminal. The RF signal conduit includes a first structure that couples the first RF terminal to the inner terminal of the threaded coaxial antenna connector. The RF signal conduit further includes a second structure that couples the second RF terminal to the outer terminal of the threaded coaxial antenna connector. The interface circuit is configured to set an SMA antenna interface mode by coupling the RF signal terminal of the RF transceiver to the first RF terminal and coupling the second RF terminal to a reference terminal. The interface circuit is also configured to set a ferrule antenna interface mode by coupling the RF signal terminal of the RF transceiver to the second RF terminal and electrically isolating the threaded coaxial antenna connector from the reference terminal.

The present disclosure also provides a method for configuring an antenna interface of a communication device. One implementation of the communication device includes an RF transceiver, a threaded coaxial antenna connector, a first RF terminal, a second RF terminal, an RF signal conduit, and an interface circuit. The method includes setting an SMA antenna interface mode with the interface circuit by coupling an RF signal terminal of the RF transceiver to the first RF terminal and coupling the second RF terminal to a reference terminal. The first RF terminal is coupled to an inner terminal of the threaded coaxial antenna connector via a first structure of the RF signal conduit. The method also includes setting a ferrule antenna interface mode with the interface circuit by coupling the RF signal terminal of the RF transceiver to the second RF terminal and electrically isolating the threaded coaxial antenna connector from the reference terminal. The second RF terminal is coupled to an outer terminal of the threaded coaxial antenna connector via a second structure of the RF signal conduit.

For ease of description, some or all of the example systems presented herein are illustrated with a single exemplar of each of its component parts. Some examples may not describe or illustrate all components of the systems. Other example implementations may include more or fewer of each of the illustrated components, may combine some components, or may include additional or alternative components.

FIG. 1 is a block diagram of an example of a communication device 100. The communication device 100 may be, for example, a portable LMR (land mobile radio) radio. The communication device 100 illustrated in FIG. 1 includes a housing 102, an RF transceiver 104, an RF plug 106, an RF signal conduit 108, an antenna 110, and an interface circuit 112. In practice, the communication device 100 includes additional components such as a microphone, a loudspeaker, a display, a power supply, a baseband processor, and the like. For ease of explanation, these additional components are not illustrated or described herein.

The RF transceiver 104 features one or more RF signal terminals through which it sends and receives RF signals to and from, for example, a wireless communications network using the antenna 110. The RF transceiver 104 illustrated in FIG. 1 includes RF signal terminal 113. In some implementations, the network operates according to an industry standard land mobile radio (LMR) or cellular protocol such as, for example, the Project 25 (P25) standard defined by the Association of Public Safety Communications Officials International (APCO), the TETRA standard defined by the European Telecommunication Standards Institute (ETSI), the Digital Private Mobile Radio (dPMR) standard also defined by the ETSI, the Digital Mobile Radio (DMR) standard also defined by the ETSI, the Long Term Evolution (LTE) (including LTE-Advanced or LTE-Advanced Pro compliant with, for example, the 3GPP TS 36 specification series), or the 5G (including a network architecture compliant with, for example, the 3GPP TS 23 specification series and a new radio (NR) air interface compliant with the 3GPP TS 38 specification series) standard, among other possibilities, and over which multimedia broadcast multicast services (MBMS), single site point-to-multipoint (SC-PTM) services, or Mission Critical Push-to-talk (MCPTT) services may be provided, or over which an open mobile alliance (OMA) push to talk (PTT) over cellular (OMA-PoC), a voice over IP (VoIP), or a PTT over IP (PoIP) application may be implemented. The RF transceiver 104 may include various digital and analog components, which for brevity are not described herein and which may be implemented in hardware, software, or a combination of both.

The RF transceiver 104 is housed on a printed circuit board 114 contained within the housing 102. In some implementations, the printed circuit board 114 is dedicated for RF components. In other implementations, the printed circuit board 114 also includes non-RF components (for example, audio components, display components, and the like). The printed circuit board 114 includes a first RF terminal 116 and second RF terminal 118 for transferring RF signals between components housed on the printed circuit board 114 and components not housed on the printed circuit board 114. For example, the first RF terminal 116 and the second RF terminal 118 provide a port for transferring RF signals between the RF plug 106 and the RF transceiver 104 as described in more detail below.

Figure 2:
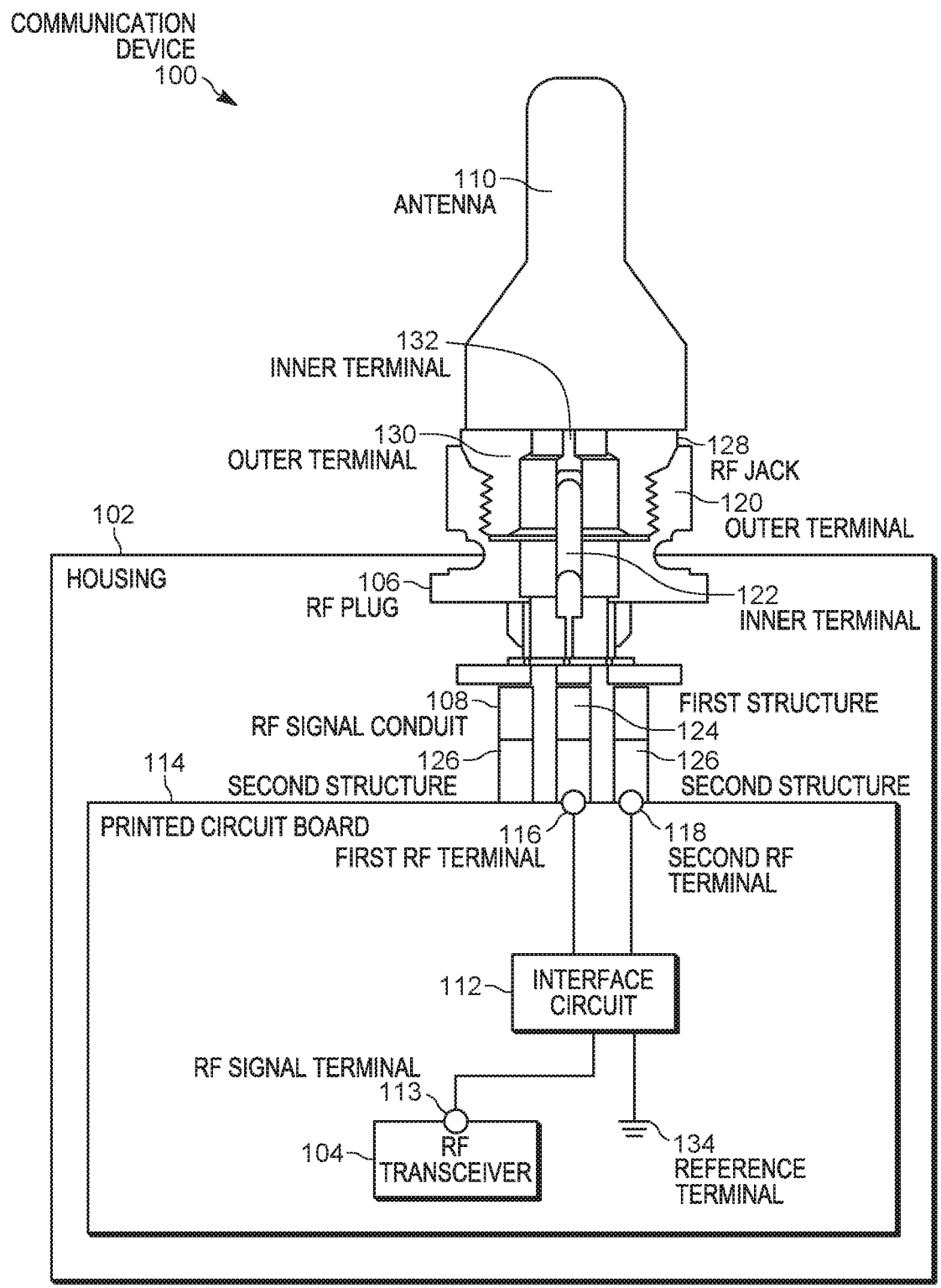
FIG. 2 is a block diagram of an example of a communication device with an RF signal conduit formed by a plurality of spring contacts, antenna having an SMA-type interface, and an interface circuit, in accordance with some implementations.

The RF plug 106 is positioned near an edge of the housing 102. The RF plug 106 (one example of a "threaded coaxial antenna connector") includes an outer terminal 120 and an inner terminal 122 which are both electrically conductive. The outer terminal 120 of the RF plug 106 is threaded. The RF plug 106 is coupled to the first RF terminal 116 and the second RF terminal 118 on the printed circuit board 114 via the RF signal conduit 108. The RF signal conduit 108 (for example, a 50-ohm coaxial transmission line) includes a first structure 124 for coupling the inner terminal 122 of the RF plug 106 to the first RF terminal 116. The RF signal conduit 108 also includes a second structure 126 for coupling the outer terminal 120 of the RF plug 106 to the second RF terminal 118. The first structure 124 and the second structure 126 are electrically conductive. In some implementations, the RF signal conduit 108 includes a coaxial cable as illustrated in FIG. 1. In other implementations, the RF signal conduit 108 includes a plurality of electrically conductive spring contacts resembling a coplanar transmission line as illustrated in FIG. 2.

Figure 3:
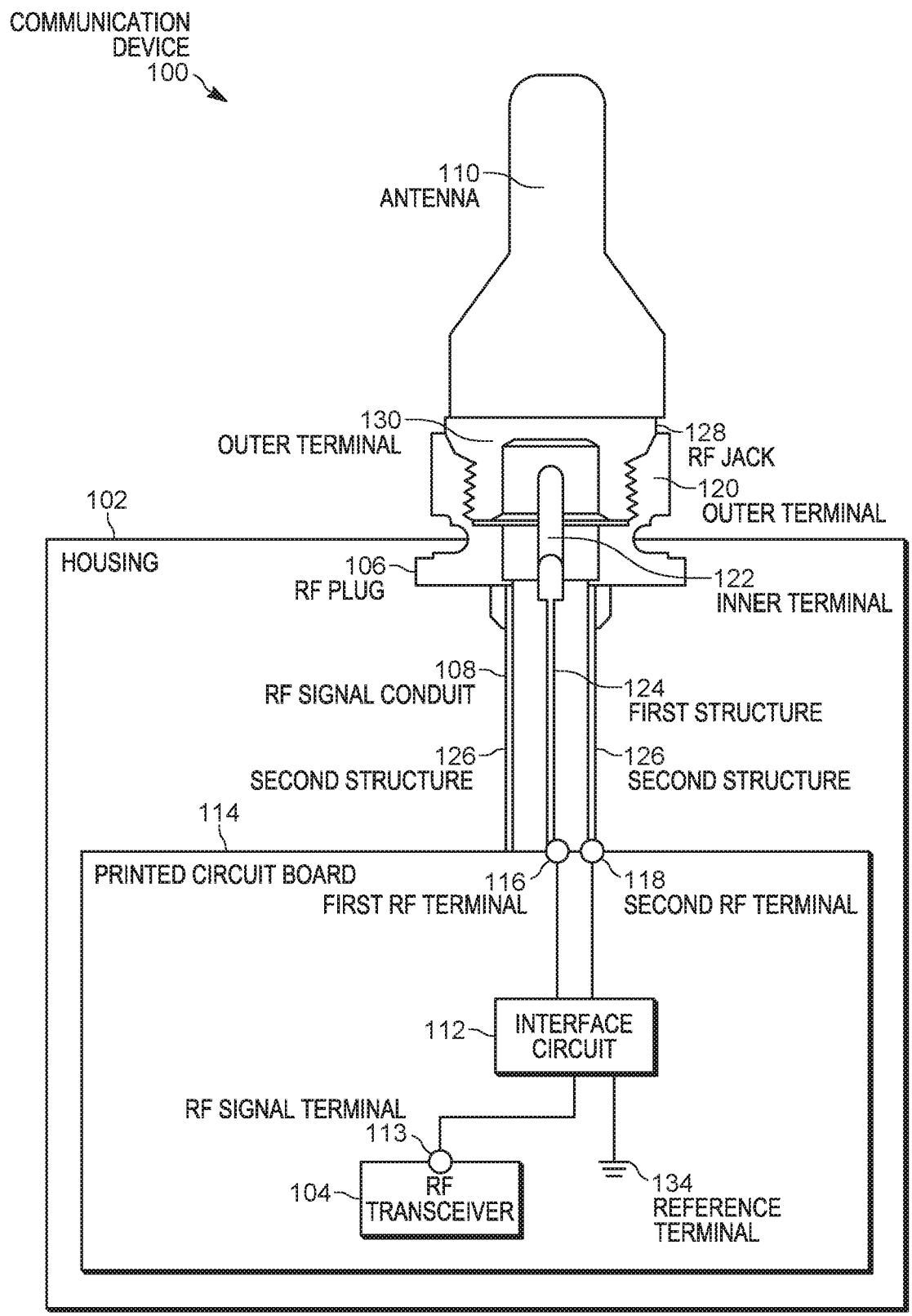
FIG. 3 is a block diagram of an example of a communication device with an RF signal conduit formed by a coaxial cable, an antenna having a one-terminal ferrule-type interface, and an interface circuit, in accordance with some implementations.

The RF plug 106 is threaded to couple with an RF jack 128 of the antenna 110. The RF jack 128 is either SMA-type or ferrule-type. The RF jack 128 illustrated in FIG. 1 is one example of a coaxial connector and includes an outer terminal 130 and an inner terminal 132 which are both electrically conductive. The outer terminal 130 of the RF jack 128 is threaded. When the RF jack 128 is coupled to the RF plug 106 as illustrated in FIG. 1, the outer terminal 130 of the RF jack 128 is electrically coupled to the outer terminal 120 of the RF plug 106 and the inner terminal 132 of the RF jack 128 is electrically coupled to the inner terminal 122 of the RF plug 106. In some implementations, when the RF jack 128 is SMA-type, the RF jack 128 includes two terminals as illustrated in FIG. 1. In other implementations, when the RF jack 128 is ferrule-type, the RF jack 128 only includes one terminal. For example, the RF jack 128 illustrated in FIG. 3 is one example of a coaxial connector that includes only the outer terminal 130. When the RF jack 128 illustrated in FIG. 3 is coupled to the RF plug 106, the outer terminal 120 of the RF plug 106 is coupled to the outer terminal 130 of the RF jack 128 and the inner terminal 122 of the RF plug 106 is not coupled to any terminal.

The antenna 110 generally comprises electrically conductive and electrically isolating parts and components that are electrically coupled with the RF jack 128. Electrically conductive parts may, for example, include wires, strips, coils, and the like, while electrically isolating parts may include printed circuit boards, spacers, stiffeners, ceramics, a protective sheath, coil forms, air pockets, and the like.

Figure 4:
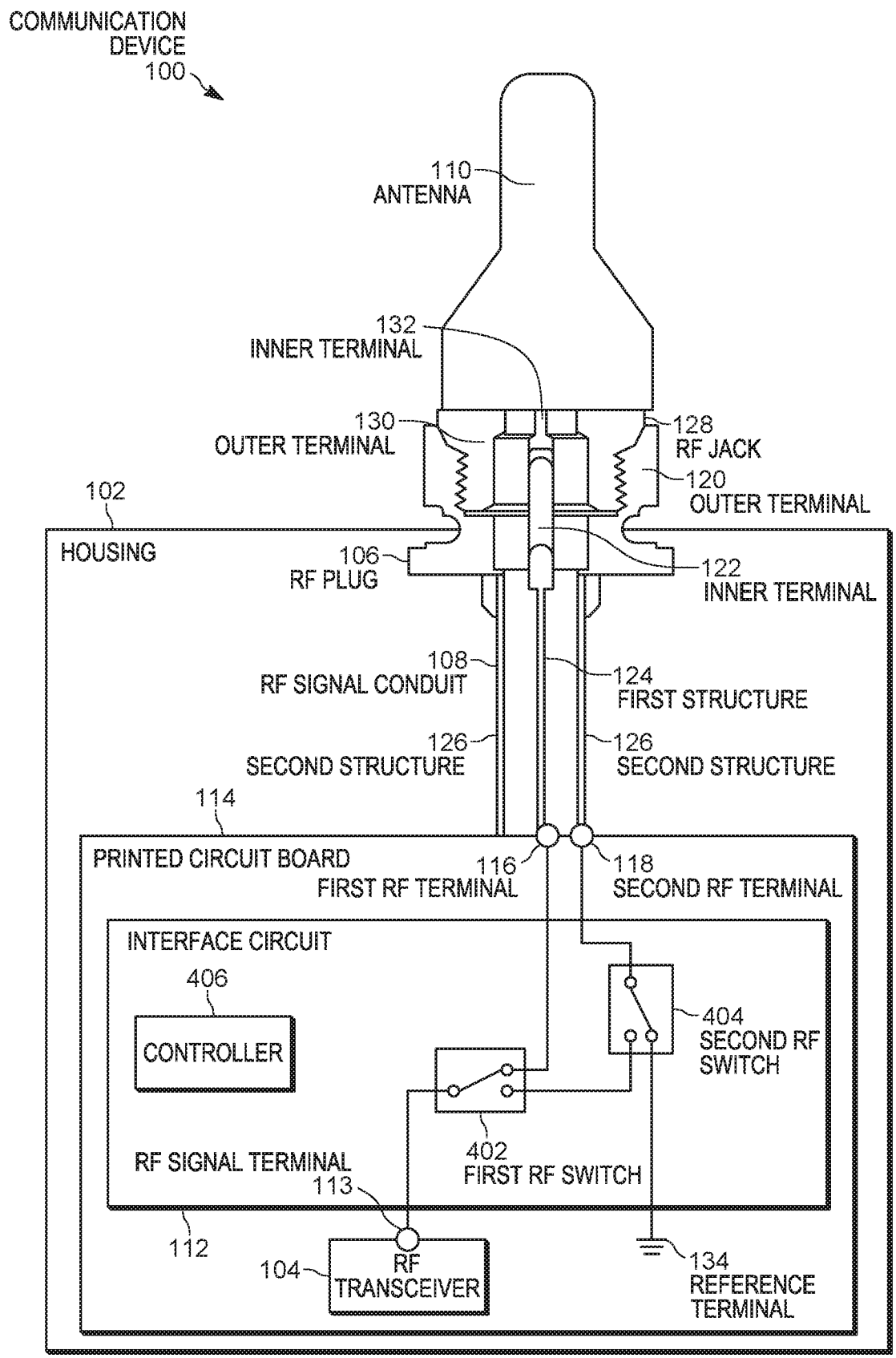
FIG. 4 is a block diagram of an example of an interface circuit configured in an SMA antenna interface mode, in accordance with some implementations.

The interface circuit 112 is configured to set different interface modes to accommodate SMA-type and ferrule-type antennas. For example, the interface circuit 112 is configured to set an SMA antenna interface mode by coupling the RF signal terminal 113 of the RF transceiver 104 to the first RF terminal 116 and coupling the second RF terminal 118 to a reference terminal 134 (for example, a ground terminal). FIG. 4 is a block diagram of an example of the interface circuit 112 when the SMA antenna interface mode is set. The interface circuit 112 illustrated in FIG. 4 includes a first RF switch 402, a second RF switch 404, and a controller 406. The first RF switch 402 and the second RF switch 404 illustrated in FIG. 4 are single pole double throw (SPDT) RF switches. In other implementations, different types of switches may be used. In some implementations, the controller 406 generates controls signals that set the states of the first RF switch 402 and the second RF switch 404. The first RF switch 402 selectively couples the RF signal terminal 113 of the RF transceiver 104 to the first RF terminal 116 or to the second RF switch 404. The second RF switch 404 selectively couples the second RF terminal 118 to the reference terminal 134 or to the first RF switch 402. When the interface circuit 112 sets the SMA antenna interface mode, the controller 406 generates controls signals that set the first RF switch 402 to couple the RF signal terminal 113 of the RF transceiver 104 to the first RF terminal 116 and the second RF switch 404 to couple the second RF terminal 118 to the reference terminal 134 as illustrated in FIG. 4. Coupling the second RF terminal 118 to the reference terminal 134 provides a ground return current path for the RF currents flowing on the second structure 126 including those emanating from an impedance matching circuit realized on a PCB that is included in some SMA-type antennas.

Figure 5:
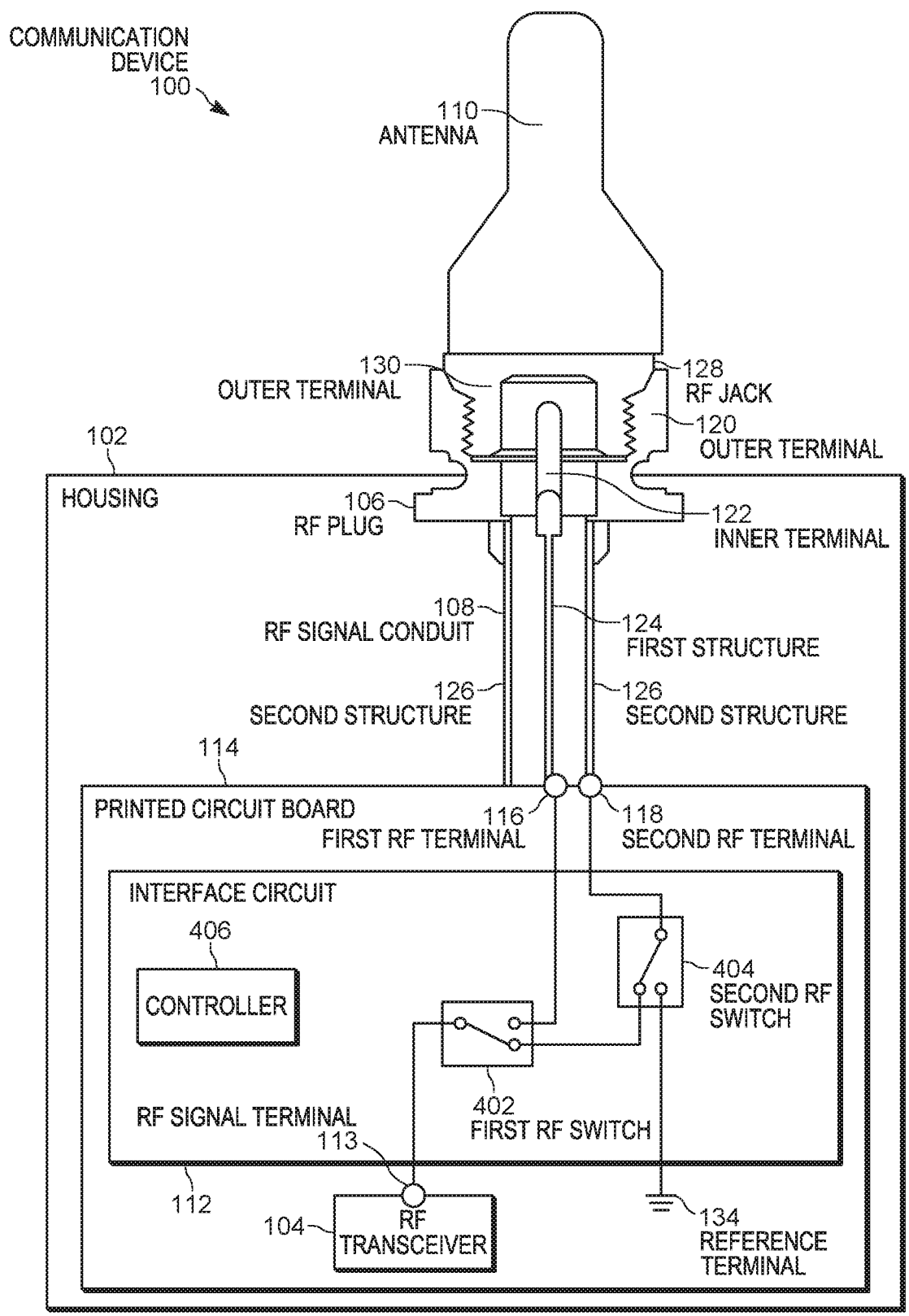
FIG. 5 is a block diagram of an example of an interface circuit configured in a ferrule antenna interface mode, in accordance with some implementations.

The interface circuit 112 is also configured to set a ferrule antenna interface mode by coupling the RF signal terminal 113 of the RF transceiver 104 to the second RF terminal 118 and electrically isolating the RF plug 106 from the reference terminal 134. FIG. 5 is a block diagram of an example of the interface circuit 112 when the ferrule antenna interface mode is set. When the interface circuit 112 sets the ferrule antenna interface mode, the controller 406 generates controls signals that set the first RF switch 402 to couple the RF signal terminal 113 of the RF transceiver 104 to the second RF switch 404 and the second RF switch 404 couples the second RF terminal 118 to the first RF switch 402 as illustrated in FIG. 5. During the ferrule antenna interface mode, the ferrule-type antenna either does not use the inner terminal 122 of the RF plug 106 during normal operation or the RF jack 128 is not coupled to the inner terminal 122 of the RF plug 106.

In some implementations, the interface circuit 112 is also configured to set an RF power testing interface mode by coupling the RF signal terminal 113 of the RF transceiver 104 to the first RF terminal 116. For example, the first RF switch 402 couples the RF signal terminal 113 of the RF transceiver 104 to the first RF terminal 116 and the second RF switch 404 couples the second RF terminal 118 to the reference terminal 134 as illustrated in FIG. 4. In the RF power testing interface mode, the interface circuit 112 provides a 50-ohm RF output for performing conducted RF power test measurements.

Figure 6:
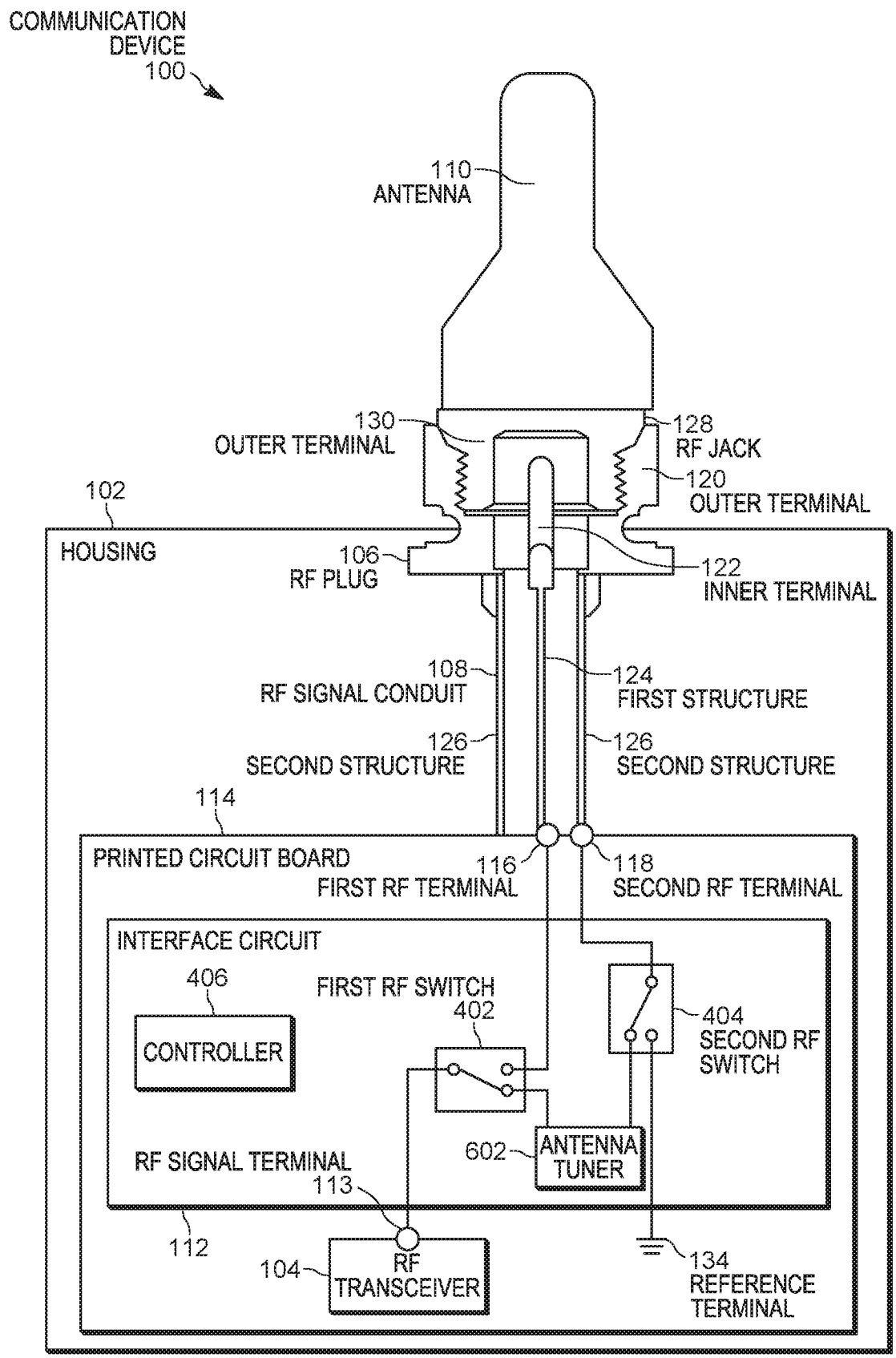
FIG. 6 is a block diagram of an example of an interface circuit including an antenna tuner, in accordance with some implementations.

In some implementations, the interface circuit 112 includes an antenna tuner 602 that is coupled between the first RF switch 402 and the second RF switch 404 as illustrated in FIG. 6. The antenna tuner 602 includes, for example, a static or a dynamic antenna tuning network, or a reconfigurable antenna tuning network. The antenna tuner 602 is engaged when the antenna 110 is ferrule-type. In some implementations, the antenna tuner 602 enables multiband LMR communication. The first RF switch 402 illustrated in FIG. 6 selectively couples the RF signal terminal 113 of the RF transceiver 104 to the first RF terminal 116 or to the antenna tuner 602. The second RF switch 404 selectively couples the second RF terminal 118 to the reference terminal 134 or to the antenna tuner 602.

In some implementations, the interface circuit 112 is configured to determine whether the RF jack 128 is SMA-type or a ferrule-type. In response to such a determination, the interface circuit 112 sets the SMA antenna interface mode when the interface circuit 112 determines that the RF jack 128 is SMA-type or sets the ferrule antenna interface mode when the interface circuit 112 determines that the RF jack 128 is ferrule-type. In some implementations, the interface circuit 112 is configured to determine whether the RF jack 128 is SMA-type or ferrule-type by determining a DC resistance of the antenna 110. The DC resistance of the antenna 110 is the resistance between the inner terminal 132 and the outer terminal 130 of the RF jack 128. For SMA-type antennas, the DC resistance of the antenna 110 is generally a DC short or a DC open. For ferrule-type connectors, the DC resistance of the antenna 110 is generally not a DC short. For example, the DC resistance of a ferrule-type antenna may be a resistance value between a DC short and a DC open. Further, the DC resistance of a ferrule-type antenna may be a DC open. For example, the DC resistance of a ferrule-type antenna may be a DC open when the RF jack 128 does not include a second terminal. Thus, in some implementations, the controller 406 determines that the RF jack 128 of the antenna 110 is SMA-type when the DC resistance of the antenna 110 is less than a short circuit threshold. Further, in some implementations, the controller 406 determines that the RF jack 128 of the antenna 110 is ferrule-type when the DC resistance of the antenna 110 is greater than or equal to the short circuit threshold. In some implementations, the controller 406 is unable to determine whether the RF jack 128 of the antenna 110 is SMA-type or ferrule-type when the DC resistance of the antenna 110 is greater than an open circuit threshold as described in more detail below.

Figure 7:
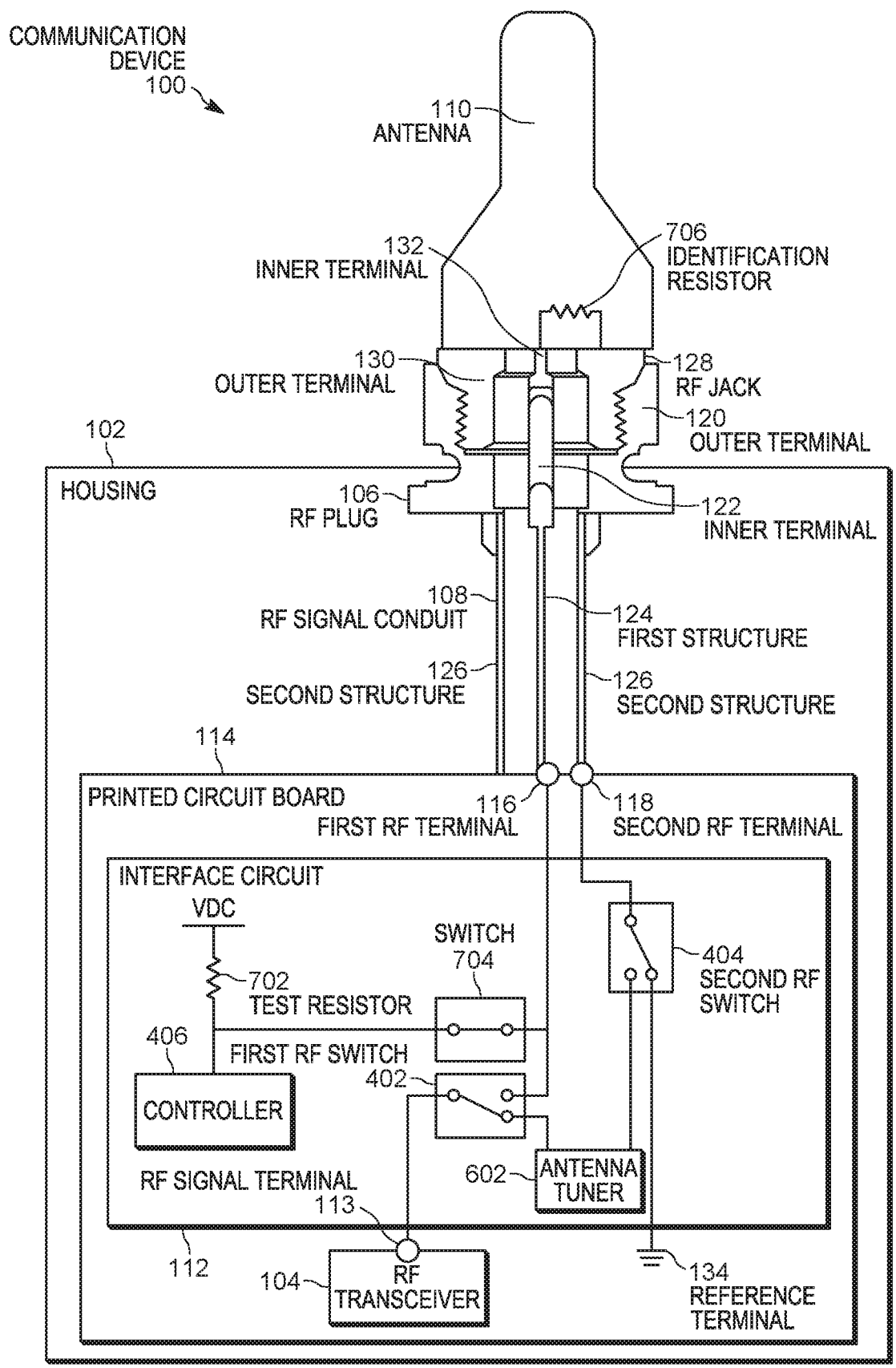
FIG. 7 is a block diagram of an example of an interface circuit including components for determining a DC resistance of an antenna, in accordance with some implementations.

FIG. 7 is a block diagram of an example of the interface circuit 112 including a test resistor 702 and a switch 704. The test resistor 702 is coupled between a DC voltage (VDC) and the first RF terminal 116 through the switch 704. The second RF switch 404 couples the second RF terminal 118 to the reference terminal 134 to close the DC circuit. The controller 406 is coupled to the test resistor 702 and measures voltages established by the test resistor 702 and the DC resistance of the antenna 110. The controller 406 determines the DC resistance of the antenna 110 based on the measured voltage, the known DC voltage (VDC), and the known resistance of the test resistor 702, of the switch 704, and of the second RF switch 404. The switch 704 selectively couples the test resistor 702 to the first RF terminal 116. The switch 704 illustrated in FIG. 7 is a single pole single throw (SPST) switch. In other implementations, a different type of switch may be used. In some implementations, the controller 406 generates control signals to control the state of the switch 704. When the interface circuit 112 is determining the DC resistance of the antenna 110, the switch 704 is in its closed state as illustrated in FIG. 7. Alternatively, when the interface circuit 112 is not determining the DC resistance of the antenna 110 (for example, during normal RF communication), the switch 704 is in its open state to prevent degrading the RF signals. In some implementations, an RF blocker (for example a large inductance component) is used in place of the switch 704.

The DC resistance of some ferrule-type antennas uniquely identifies the model of the antenna. In some implementations, the controller 406 is configured to determine a model of the antenna 110 based on the DC resistance and configures the antenna tuner 602 based on the model of the antenna 110. Some antennas with ferrule-type connectors include a resistor whose resistance value identifies the model of the antenna. For example, the antenna 110 illustrated in FIG. 7 includes an identification resistor 706 coupled between the outer terminal 130 and the inner terminal 132 of the RF jack 128. In some implementations, the controller 406 is configured to determine the DC resistance of the antenna 110 by determining the resistance of the identification resistor 706.

Figure 8:
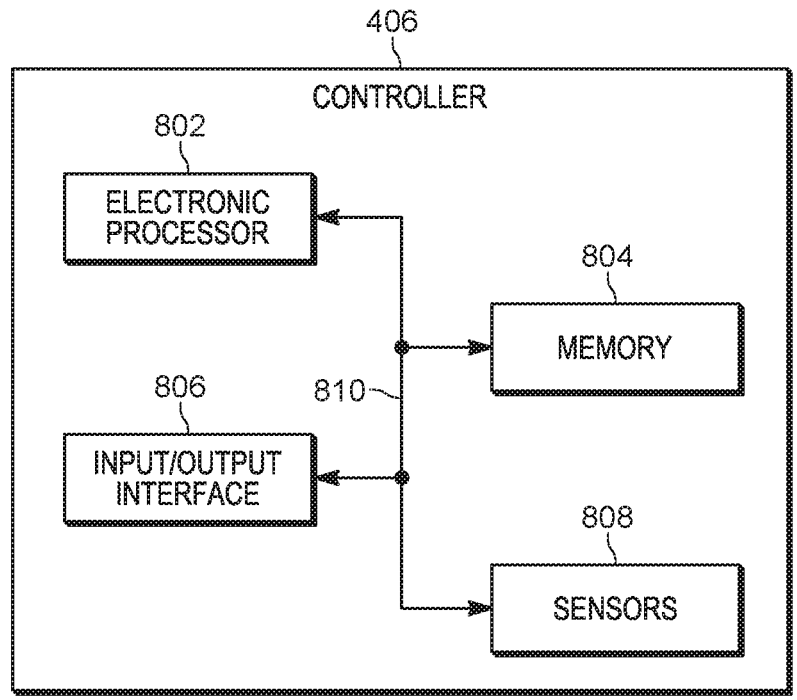
FIG. 8 is a block diagram of an example of a controller, in accordance with some implementations.

FIG. 8 is a block diagram of an example of the controller 406. The controller 406 illustrated in FIG. 8 includes an electronic processor 802 (for example, one or more microprocessors, ASICs, SoCs, or other electronic controllers), a memory 804, an input/output interface 806, sensors 808, and a bus 810. The bus 810 connects various components of the controller 406 including, for example, the memory 804 to the electronic processor 802. The memory 804 includes read-only memory (ROM), random access memory (RAM), an electrically erasable programmable read-only memory (EEPROM), other non-transitory computer-readable media, or a combination thereof. The electronic processor 802, in some implementations, is configured to retrieve program instructions and data from the memory 804 and execute, among other things, instructions to perform the methods described herein. Alternatively, or in addition, the memory 804 is included in the electronic processor 802.

The input/output interface 806 includes routines for transferring information and signals between components within the controller 406 and other components mounted on the printed circuit board 114, as well as other components of the communication device 100 that are not mounted on the printed circuit board 114. The input/output interface 806 is configured to send and receive signals via wires, fiber, wirelessly, or a combination thereof. Signals may include, for example, control signals, information, data, serial data, data packets, analog signals, or a combination thereof. For example, the input/output interface 806 may send control signals which set the states of the first RF switch 402, the second RF switch 404, the switch 704, or a combination thereof.

The sensors 808 (for example, voltage sensors, current sensors, and the like) detect electrical characteristics of the interface circuit 112. For example, the sensors 808 measure voltage and/or current values at various nodes and junctions of the printed circuit board 114. In some implementations, the sensors 808 are used to determine the DC resistance of the antenna 110 by determining the voltage between the first RF terminal 116 and the second RF terminal 118 while a DC voltage (for example, VDC) is applied to the test resistor 702.

In some implementations, the controller 406 is mounted on the printed circuit board 114 as illustrated in FIGS. 4 through 7. In other implementations, the controller 406 is mounted on a separate printed circuit board. In some implementations, all (or any portion) of the functions described herein as being performed by the controller 406 may be performed by a different component. For example, some of these functions may be performed by the RF transceiver 104.

Figure 9:
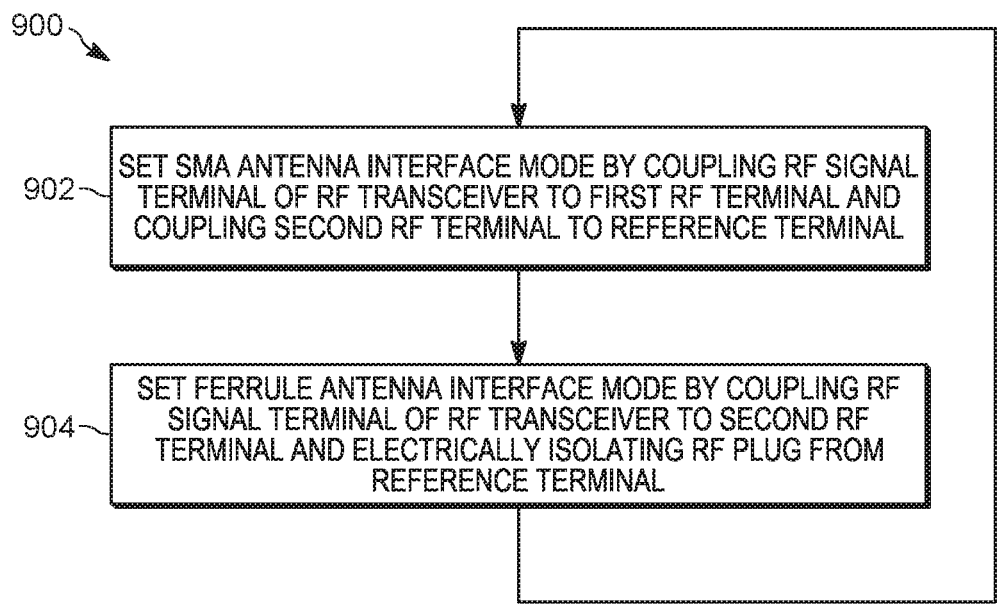
FIG. 9 is a flow diagram of an example of a method for configuring an antenna interface of a communication device, in accordance with some implementations.

FIG. 9 is a flow diagram of an example of a method 900 for configuring an antenna interface of the communication device 100. At block 902, the interface circuit 112 sets the SMA antenna interface mode by coupling the RF signal terminal 113 of the RF transceiver 104 to the first RF terminal 116 and coupling the second RF terminal 118 to the reference terminal 134. For example, the controller 406 generates control signals which cause the first RF switch 402 to couple the RF signal terminal 113 of the RF transceiver 104 to the first RF terminal 116 and cause the second RF switch 404 to couple the second RF terminal 118 to the reference terminal 134 as illustrated in FIG. 4. At block 904, the interface circuit 112 sets the ferrule antenna interface mode by coupling the RF signal terminal 113 of the RF transceiver 104 to the second RF terminal 118 and electrically isolating the RF plug 106 from the reference terminal 134. For example, the controller 406 generates control signals which cause the first RF switch 402 to couple the RF signal terminal 113 of the RF transceiver 104 to the second RF switch 404 and cause the second RF switch 404 to couple the second RF terminal 118 to the first RF switch 402 as illustrated in FIG. 5. As a further example, the controller 406 generates control signals which cause the first RF switch 402 to couple the RF signal terminal 113 of the RF transceiver 104 to the antenna tuner 602 and cause the second RF switch 404 to couple the second RF terminal 118 to the antenna tuner 602 as illustrated in FIG. 6. As a result of the first RF switch 402 and the second RF switch 404 being coupled to each other (or to the antenna tuner 602), the RF plug 106 (one example of a "threaded coaxial antenna connector") is electrically isolated from the reference terminal 134.

Figure 10:
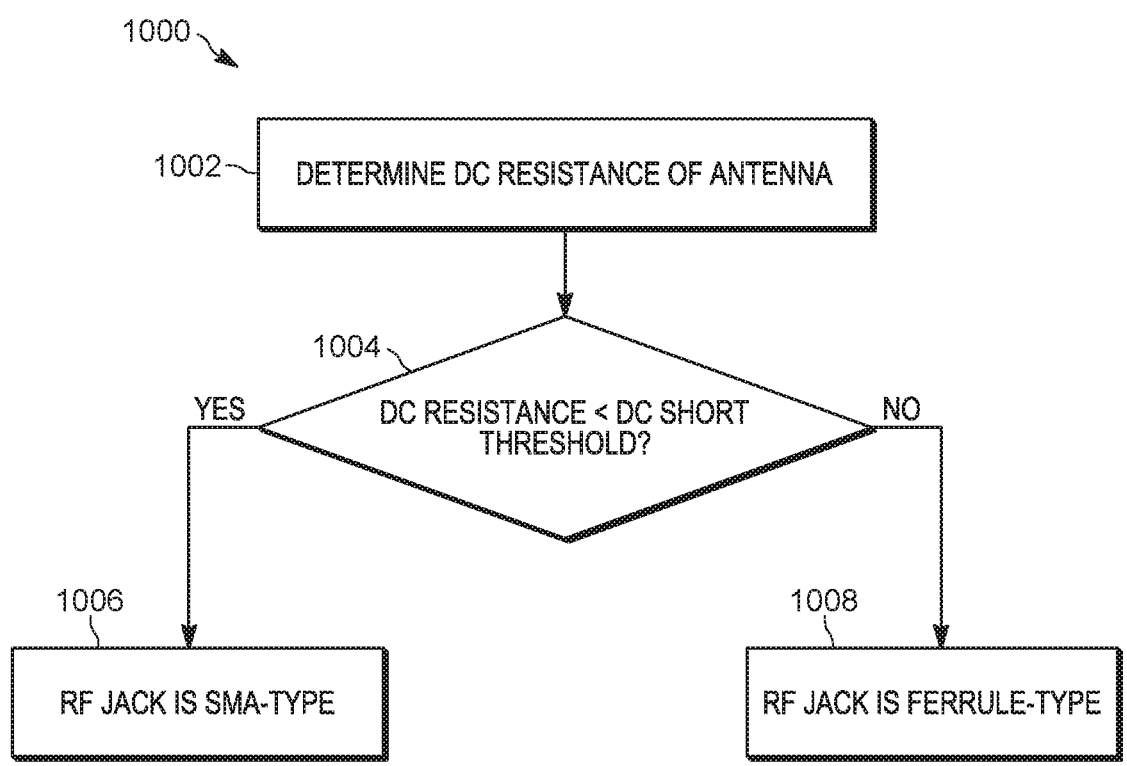
FIG. 10 is a flow diagram of an example of a method for determining whether an RF jack of antenna coupled to a communication device is SMA-type or ferrule-type, in accordance with some implementations.

In some implementations, the interface circuit 112 sets the SMA antenna interface mode (at block 902) or the ferrule antenna interface mode (at block 904) based on the type of antenna 110 coupled to the RF plug 106. As described above, in some implementations, the interface circuit 112 determines whether the RF jack 128 of the antenna 110 is SMA-type or ferrule-type. FIG. 10 is a flow diagram of an example of a method 1000 for determining whether the RF jack 128 of the antenna 110 is SMA-type or ferrule type. At block 1002, the interface circuit 112 determines the DC resistance of the antenna 110. For example, the interface circuit 112 determines the DC resistance of the antenna 110 as described above in relation to FIG. 7. At block 1004, the interface circuit 112 determines whether the DC resistance of the antenna 110 is less than a DC short threshold. As described above, in some implementations, SMA-type antennas may feature a DC short between the two terminals of their SMA connector. Thus, when the DC resistance of the antenna 110 is less than the DC short threshold, the interface circuit 112 determines that the RF jack 128 is SMA-type at block 1006. Alternatively, when the DC resistance of the antenna 110 is greater than or equal to the DC short threshold, the interface circuit 112 determines that the RF jack 128 is ferrule-type at block 1008.

Some SMA-type and ferrule-type antennas have an open DC resistance. In some implementations in which the communication device 100 is configured to operate with both SMA-type and ferrule-type antennas having open DC resistances, the interface circuit 112 prompts the user to identify the antenna-type when the DC resistance of the antenna 110 is greater than a DC open threshold. In some implementations in which the communication device 100 is not configured to operate with SMA-type antennas having open DC resistances, the interface circuit 112 is configured to determine the RF jack 128 of the antenna 110 is ferrule-type when the DC resistance is greater than a DC open threshold.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 20%, in another embodiment within 10%, in another embodiment within 2% and in another embodiment within 1%. The term "coupled" as used herein is defined as connected, although not necessarily directly and not necessarily mechanically. A device or structure that is "configured" in a certain way is configured in at least that way but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A communication device comprising:
    an RF transceiver including an RF signal terminal;
    a threaded coaxial antenna connector including an inner terminal and an outer terminal;
    a first RF terminal;
    a second RF terminal;
    an RF signal conduit including:
        a first structure coupling the first RF terminal to the inner terminal of the threaded coaxial antenna connector, and
        a second structure coupling the second RF terminal to the outer terminal of the threaded coaxial antenna connector; and
    an interface circuit configured to:
        set an SMA antenna interface mode by coupling the RF signal terminal of the RF transceiver to the first RF terminal and coupling the second RF terminal to a reference terminal, and
        set a ferrule antenna interface mode by coupling the RF signal terminal of the RF transceiver to the second RF terminal and electrically isolating the threaded coaxial antenna connector from the reference terminal.

2. The communication device of claim 1, wherein the interface circuit is further configured to:
    detect whether a coaxial connector of an antenna coupled to the threaded coaxial antenna connector is an SMA or a ferrule,
    set the SMA antenna interface mode when the coaxial connector of the antenna is the SMA, and
    set the ferrule antenna interface mode when the coaxial connector of the antenna is the ferrule.

3. The communication device of claim 2, wherein, to detect whether the coaxial connector of the antenna is the SMA or the ferrule, the interface circuit is further configured to:
    determine a DC resistance of the antenna,
    determine the coaxial connector of the antenna is the SMA when the DC resistance of the antenna is less than a DC short threshold, and
    determine the coaxial connector of the antenna is the ferrule when the DC resistance of the antenna is greater than or equal to the DC short threshold.

4. The communication device of claim 1, wherein the interface circuit includes a first RF switch and a second RF switch, wherein the first RF switch is configured to selectively couple the RF signal terminal of the RF transceiver to the first RF terminal or to the second RF switch, and wherein the second RF switch is configured to selectively couple the second RF terminal to the reference terminal or to the first RF switch.

5. The communication device of claim 1, further comprising an antenna tuner, wherein the interface circuit is further configured to couple the antenna tuner between the RF signal terminal of the RF transceiver and the second RF terminal when the ferrule antenna interface mode is set.

6. The communication device of claim 5, wherein the interface circuit is further configured to:
   determine a DC resistance of an antenna coupled to the threaded coaxial antenna connector,
   determine a model of the antenna based on the DC resistance of the antenna, and
   configure the antenna tuner based on the model of the antenna.

7. The communication device of claim 6, wherein, to determine the DC resistance of the antenna, the interface circuit is further configured to determine a resistance of an identification resistor included in the antenna.

8. The communication device of claim 5, wherein the interface circuit includes:
   a first RF switch configured to selectively couple the RF signal terminal of the RF transceiver to the first RF terminal or to the antenna tuner, and
   a second RF switch configured to selectively couple the second RF terminal to the reference terminal or to the antenna tuner.

9. The communication device of claim 5, wherein the antenna tuner includes a dynamic antenna tuning network or a reconfigurable antenna tuning network.

10. The communication device of claim 1, wherein the interface circuit is further configured to set an RF power testing interface mode by coupling the RF signal terminal of the RF transceiver to the first RF terminal.

11. The communication device of claim 1, wherein the RF signal conduit includes a coaxial cable.

12. The communication device of claim 1, wherein the RF signal conduit includes a plurality of spring contacts forming a coplanar transmission line.

13. A method for configuring an antenna interface of a communication device, the communication device including an RF transceiver, a threaded coaxial antenna connector, a first RF terminal, a second RF terminal, an RF signal conduit, and an interface circuit, the method comprising:
   setting an SMA antenna interface mode with the interface circuit by coupling an RF signal terminal of the RF transceiver to the first RF terminal and coupling the second RF terminal to a reference terminal, wherein the first RF terminal is coupled to an inner terminal of the threaded coaxial antenna connector via a first structure of the RF signal conduit; and
   setting a ferrule antenna interface mode with the interface circuit by coupling the RF signal terminal of the RF transceiver to the second RF terminal and electrically isolating the threaded coaxial antenna connector from the reference terminal, wherein the second RF terminal is coupled to an outer terminal of the threaded coaxial antenna connector via a second structure of the RF signal conduit.

14. The method of claim 13, further comprising:
   determining, with the interface circuit, whether a coaxial connector of an antenna coupled to the threaded coaxial antenna connector is an SMA or a ferrule;
   setting the SMA antenna interface mode with the interface circuit when the coaxial connector of the antenna is the SMA; and
   setting the ferrule antenna interface mode with the interface circuit when the coaxial connector of the antenna is the ferrule.

15. The method of claim 14, wherein determining whether the coaxial connector of the antenna is the SMA of the ferrule includes:
   determining a DC resistance of the antenna;
   determining the coaxial connector of the antenna is the SMA when the DC resistance of the antenna is less than a DC short threshold; and
   determining the coaxial connector of the antenna is the ferrule when the DC resistance of the antenna is greater than or equal to the DC short threshold.

16. The method of claim 13, wherein setting the ferrule antenna interface mode includes:
   coupling the RF signal terminal of the RF transceiver to an antenna tuner, and
   coupling the second RF terminal to the antenna tuner.

17. The method of claim 16, further comprising:
   determining a DC resistance of an antenna coupled to the threaded coaxial antenna connector;
   determining a model of the antenna based on the DC resistance of the antenna; and
   configuring the antenna tuner based on the model of the antenna.

18. The method of claim 17, wherein measuring the DC resistance of the antenna includes determining a resistance of an identification resistor included in the antenna.

19. The method of claim 16, wherein setting the SMA antenna interface mode includes:
   coupling the RF signal terminal of the RF transceiver to the first RF terminal with a first RF switch included in the interface circuit, and
   coupling the second RF terminal to the reference terminal with a second RF switch included in the interface circuit,
   wherein setting the ferrule antenna interface mode includes:
   coupling the RF signal terminal of the RF transceiver to the antenna tuner with the first RF switch, and
   coupling the second RF terminal to the antenna tuner with the second RF switch.

20. The method of claim 13, further comprising setting an RF power testing interface mode by coupling the RF signal terminal of the RF transceiver to the first RF terminal.

* * * * *